US009872059B2

(12) United States Patent
White et al.

(10) Patent No.: US 9,872,059 B2
(45) Date of Patent: *Jan. 16, 2018

(54) APPARATUS AND METHOD FOR MANAGING SET TOP BOXES

(71) Applicant: AT&T Intellectual Property I, LP, Atlanta, GA (US)

(72) Inventors: Scott White, Austin, TX (US); James Cansler, Pflugerville, TX (US); Gerard Edwards, Lansing, NY (US); Loraine Sanchez, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,734

(22) Filed: May 19, 2014

(65) Prior Publication Data

US 2014/0259088 A1    Sep. 11, 2014

Related U.S. Application Data

(63) Continuation of application No. 13/669,549, filed on Nov. 6, 2012, which is a continuation of application
(Continued)

(51) Int. Cl.
*H04N 21/2747* (2011.01)
*H04N 21/44* (2011.01)
(Continued)

(52) U.S. Cl.
CPC ......... *H04N 21/2747* (2013.01); *H04N 7/165* (2013.01); *H04N 21/254* (2013.01); *H04N 21/27* (2013.01); *H04N 21/274* (2013.01); *H04N 21/41* (2013.01); *H04N 21/4135* (2013.01); *H04N 21/4147* (2013.01); *H04N 21/43* (2013.01); *H04N 21/4325* (2013.01); (Continued)

(58) Field of Classification Search
None
See application file for complete search history.

(56) References Cited

U.S. PATENT DOCUMENTS

| 7,954,131 B2 | 5/2011 | Cholas |
| 2002/0040475 A1* | 4/2002 | Yap ................. G11B 27/034 725/39 |

(Continued)

FOREIGN PATENT DOCUMENTS

WO    2006055921    5/2006

*Primary Examiner* — Justin Shepard
(74) *Attorney, Agent, or Firm* — Guntin & Gust, PLC; Douglas Schnabel (57) ABSTRACT

A system that incorporates teachings of the present disclosure may include, for example, a set top box having a controller to eliminate a scheduled recording of a targeted media program, where the scheduled recording is a redundant recording of the targeted media program that is determined based upon monitoring of recordings of media programs by a group of set top boxes in communication with each other over a network, where another set top box of the group of set top boxes is designated as a host set top box to record the targeted media program, and where the controller is provided access to the targeted media program by the host set top box. Other embodiments are disclosed.

20 Claims, 5 Drawing Sheets

Related U.S. Application Data

No. 11/855,677, filed on Sep. 14, 2007, now Pat. No. 8,359,625.

(51) Int. Cl.

| | |
|---|---|
| *H04N 21/432* | (2011.01) |
| *H04N 21/41* | (2011.01) |
| *H04N 21/45* | (2011.01) |
| *H04N 21/274* | (2011.01) |
| *H04N 21/442* | (2011.01) |
| *H04N 21/43* | (2011.01) |
| *H04N 21/27* | (2011.01) |
| *H04N 21/458* | (2011.01) |
| *H04N 7/16* | (2011.01) |
| *H04N 21/254* | (2011.01) |
| *H04N 21/433* | (2011.01) |
| *H04N 21/4335* | (2011.01) |
| *H04N 21/63* | (2011.01) |
| *H04N 21/6543* | (2011.01) |
| *H04N 21/4147* | (2011.01) |

(52) U.S. Cl.
CPC ..... *H04N 21/4334* (2013.01); *H04N 21/4335* (2013.01); *H04N 21/44* (2013.01); *H04N 21/442* (2013.01); *H04N 21/45* (2013.01); *H04N 21/4583* (2013.01); *H04N 21/632* (2013.01); *H04N 21/6543* (2013.01)

(56) References Cited

U.S. PATENT DOCUMENTS

| | | | |
|---|---|---|---|
| 2004/0250282 A1* | 12/2004 | Bankers | A63F 13/12 725/58 |
| 2005/0102698 A1 | 5/2005 | Bumgardner et al. | |
| 2005/0120386 A1 | 6/2005 | Stone | |
| 2005/0240694 A1 | 10/2005 | Tseng | |
| 2005/0246738 A1 | 11/2005 | Lockett | |
| 2006/0024027 A1* | 2/2006 | Yokota et al. | 386/83 |
| 2006/0025132 A1 | 2/2006 | Karaoguz | |
| 2006/0127037 A1 | 6/2006 | Van Hoff | |
| 2006/0215991 A1* | 9/2006 | Larson et al. | 386/83 |
| 2006/0218598 A1* | 9/2006 | Casey et al. | 725/86 |
| 2006/0242325 A1* | 10/2006 | Ramaswamy | H04H 20/95 709/246 |
| 2007/0009235 A1 | 1/2007 | Walters | |
| 2007/0033232 A1 | 2/2007 | Malloy | |
| 2007/0039033 A1* | 2/2007 | Ota | H04N 21/4147 725/115 |
| 2007/0192798 A1 | 8/2007 | Morgan | |
| 2008/0046954 A1 | 2/2008 | Bhogal | |
| 2008/0052744 A1 | 2/2008 | Hamasaka | |
| 2008/0159714 A1 | 7/2008 | Harrar | |
| 2008/0235731 A1* | 9/2008 | Bryant et al. | 725/44 |
| 2009/0031392 A1 | 1/2009 | VerSteeg | |

\* cited by examiner

APPARATUS AND METHOD FOR MANAGING SET TOP BOXES

CROSS-REFERENCE TO RELATED APPLICATIONS

This application is a Continuation of and claims priority to U.S. patent application Ser. No. 13/669,549, which is a Continuation of and claims priority to U.S. Pat. No. 8,359,625. The contents of each of the foregoing is/are hereby incorporated by reference into this application as if set forth herein in full.

FIELD OF THE DISCLOSURE

The present disclosure relates generally to communication services and more specifically to an apparatus and method for managing set top boxes.

BACKGROUND

Set top boxes (STBs) can provide presentation of media programming and content, as well as recording of such programming and content. However, STBs are limited by hardware constraints or other system capabilities. The number of individual tuner cards in an STB can limit the number of simultaneous DVR recordings or playbacks an STB can perform. The user can, with some frequency, run into scenarios where all available tuner cards are in use, and additional recordings cannot be scheduled.

DETAILED DESCRIPTION

In one embodiment of the present disclosure, a computer-readable storage medium can have computer instructions for monitoring recordings of media programs by a group of set top boxes where the set top boxes are in communication with each other over a network, determining a redundant recording of a targeted media program based upon the recordings of the media programs, designating a host set top box from the group of set top boxes to perform a recording of the targeted media program, eliminating recording of the targeted media program by one or more other set top boxes from the group of set top boxes, and providing the one or more other set top boxes with access to the recorded targeted media program.

In one embodiment of the present disclosure, a server can have a controller to monitor recordings of media programs by a group of set top boxes, determine a redundant recording of a targeted media program based upon the recordings of the media programs, designate a host set top box from the group of set top boxes to perform a recording of the targeted media program, and eliminate recording of the targeted media program by one or more other set top boxes from the group of set top boxes.

In one embodiment of the present disclosure, a server can have a controller to monitor media content stored by a group of set top boxes in communication with each other over a network, determine redundant media content stored by the group of set top boxes, designate a target media content from the redundant media content, designate a host set top box to store the target media content, delete the redundant media content from one or more of the group of set top boxes, and provide the one or more of the group of set top boxes with access to the target media content stored by the host set top box.

In one embodiment of the present disclosure, a set top box can have a controller to eliminate a scheduled recording of a targeted media program where the scheduled recording is a redundant recording of the targeted media program that is determined based upon monitoring of recordings of media programs by a group of set top boxes in communication with each other over a network, where another set top box of the group of set top boxes is designated as a host set top box to record the targeted media program, and where the controller is provided access to the targeted media program by the host set top box.

In one embodiment of the present disclosure, a method can involve monitoring recordings of media programs by a group of set top boxes, determining a redundant recording of a targeted media program based upon the recordings of the media programs, designating a host set top box from the group of set top boxes to perform a recording of the targeted media program, and eliminating recording of the targeted media program by one or more other set top boxes from the group of set top boxes.

Figure 1:
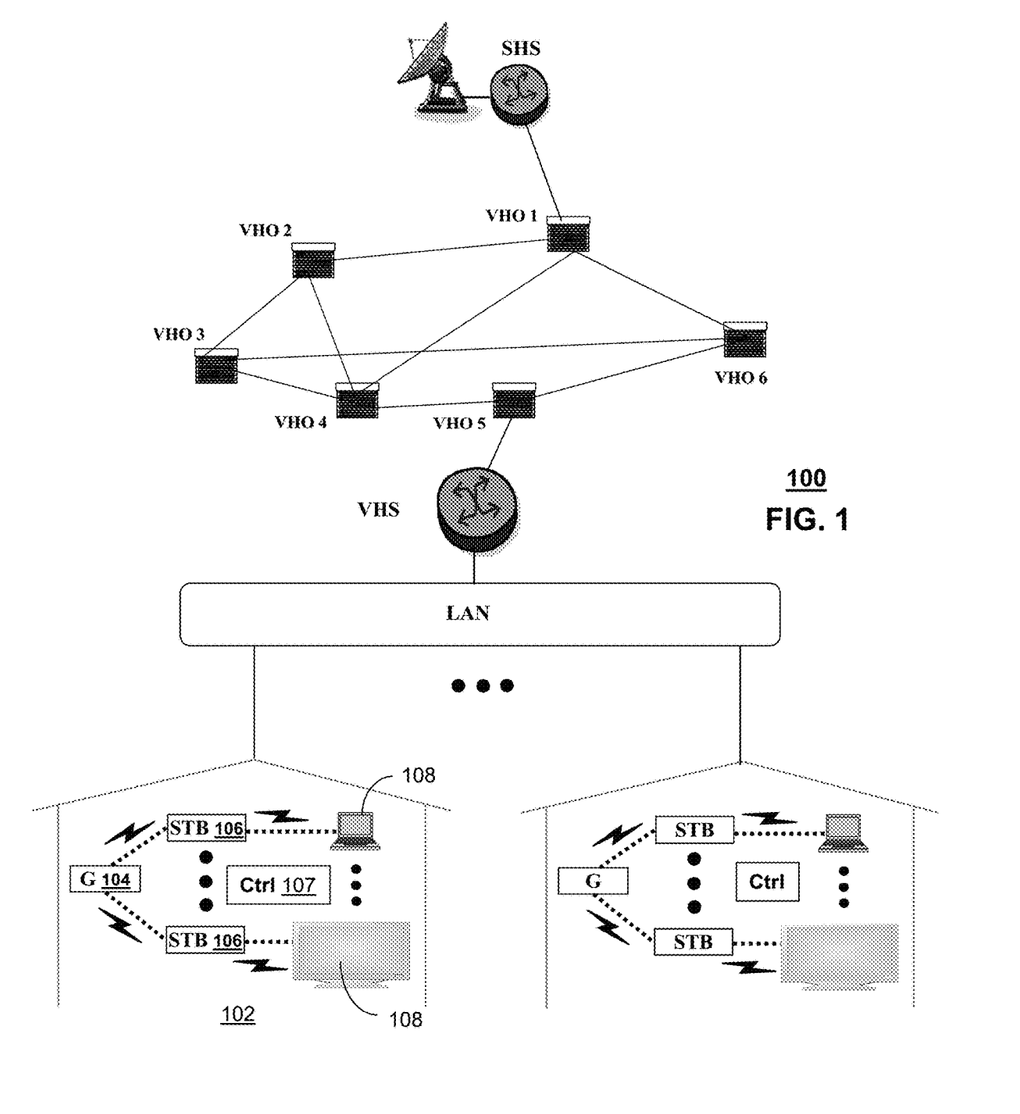
FIGS. 1-3 depict exemplary embodiments of a communication system.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
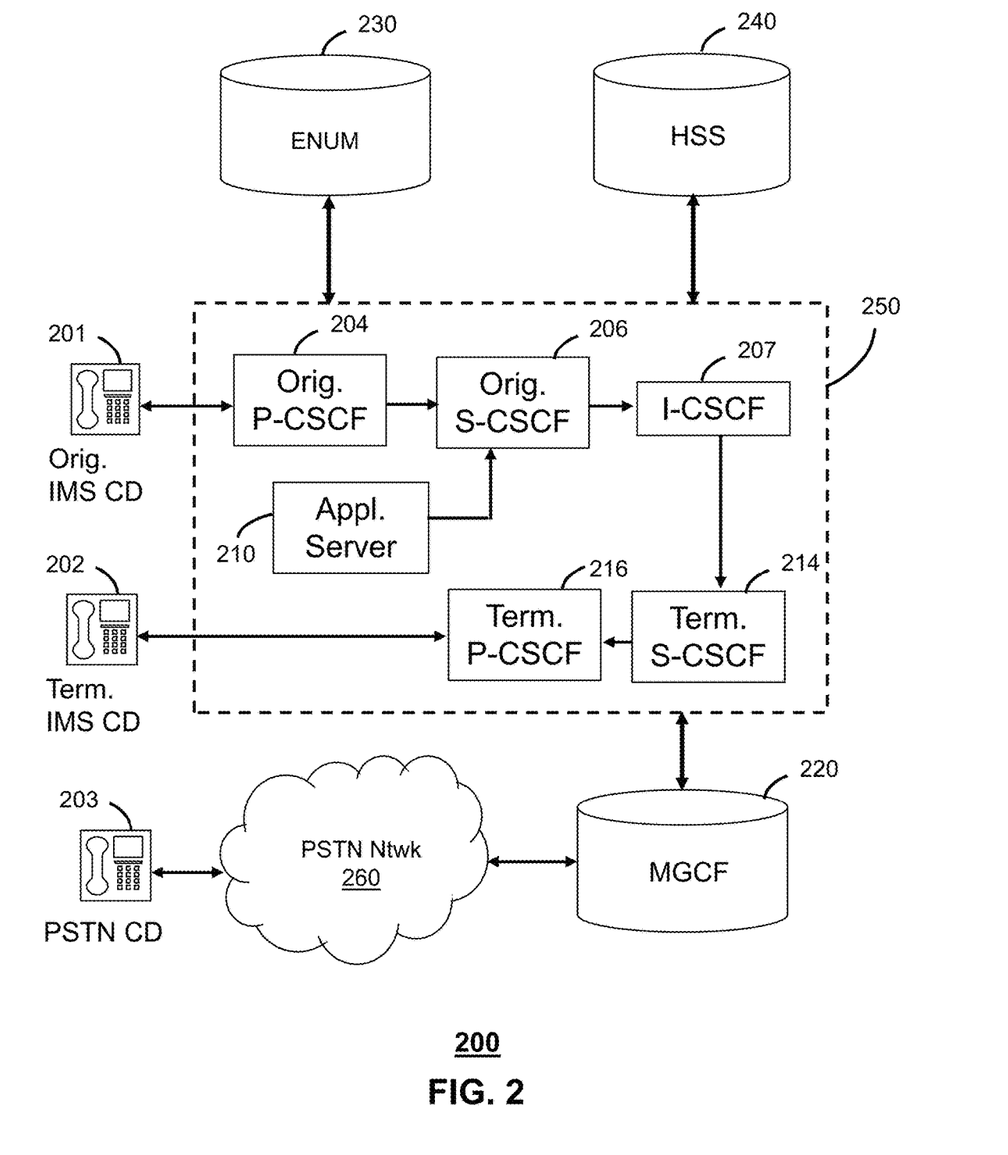

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 (e.g., set top boxes) or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
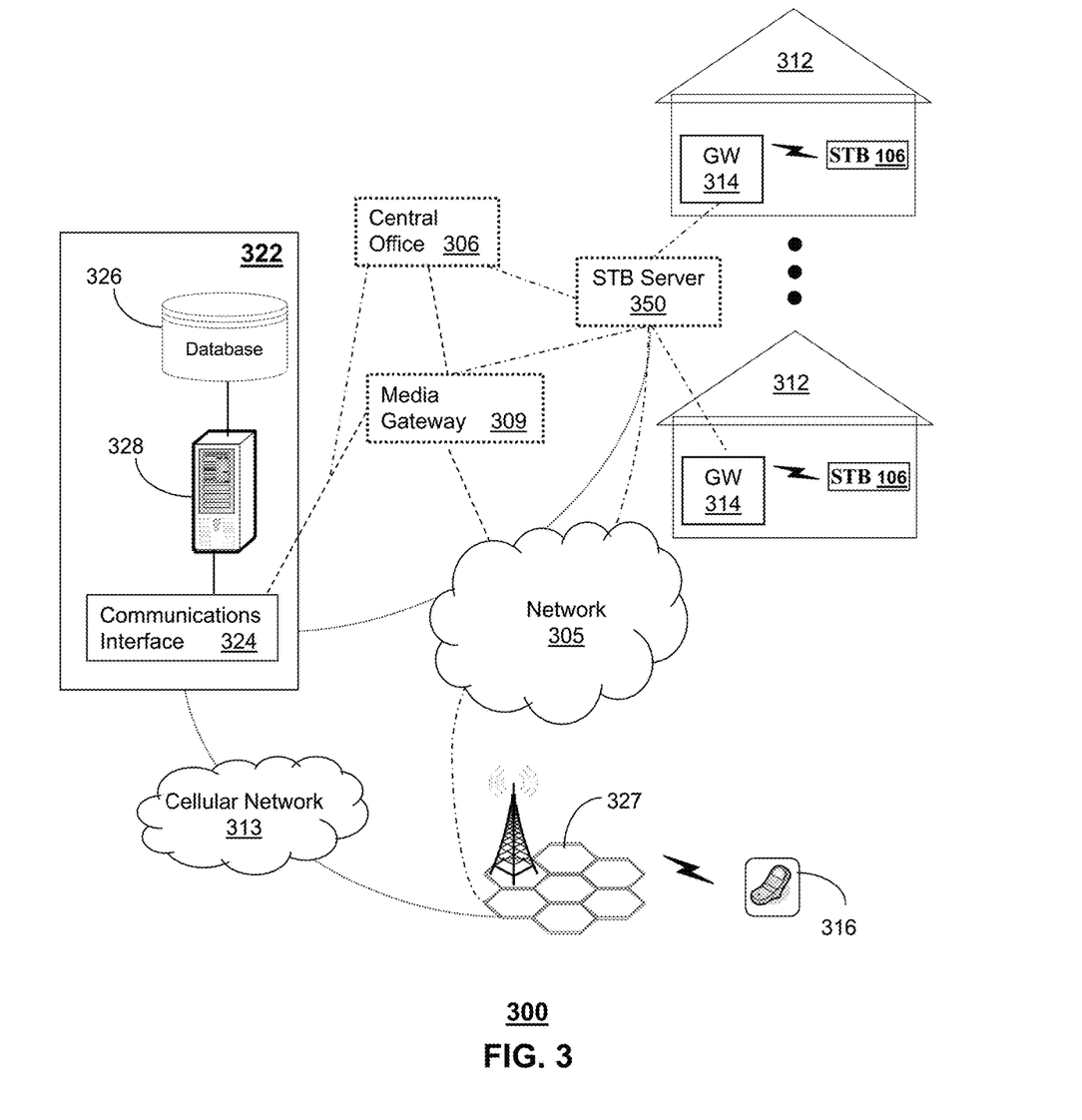

FIG. 3 depicts an exemplary embodiment of a communication system 300 employing set top box 106 communicating by way of wireless access points (WAPs) and/or wired infrastructure with other set top boxes and/or other communication devices and/or a network proxy or web server 322, which collectively operate in the communication system 300. Communication system 300 can be overlaid or operably coupled with communication systems 100 and/or 200 as another representative embodiment of the communication system.

The set top boxes 106 can be multimedia devices for communicating video, voice and/or data, as well as receiving multimedia programming. The set top boxes 106 can include a tuner for receipt of the media programming, and can include a digital video recorder (DVR) or personal video recorder (PVR). The set top boxes 106 can be multimode communication devices that can communicate via a number of modes of communication, including wired and/or wireless communication. The communication system 300 can comprise a packet-switched network 305. The packet-switched network can be an Internet Service Provider (ISP) network 305. The network 305 can be coupled to the network proxy 322, the cellular network 313 and network elements located in one or more of the buildings 312 representing an enterprise or residence. The ISP network 305 utilizes technology for transporting Internet traffic.

In an enterprise setting, the building 312 can include a gateway 314 that provides voice and/or video connectivity services between the set top boxes 106. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306 and the gateway 314. Communications between the network proxy 322, the set top boxes 106 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 314. By way of the communications interface 324, the network proxy 322 can direct by common means any of the foregoing network elements to establish packet switched data, voice, and/or video connections between set top boxes 106 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for the set top boxes 106, including VoIP terminals.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-1X, UMTS, WiMAX, software defined radio (SDR), and other known and future technologies. The cellular network 313 can be coupled to base stations 327 under a frequency-reuse plan for communicating over-the-air with other communication devices of the communication system, including set top boxes 106.

The communication system 300 can include an STB server 350 that is in communication with one or more of the STBs 106 in the system. The STB server 350 can include various components, such as a controller, communications interface and memory, and can utilize various protocols for communication with the STBs 106, as well as with other communication or network devices of the communication system 300. The STB server 350 can be a separate device or sub-system of the communication system 300, or can be incorporated with other components of the communication system, such as being incorporated into the network proxy 322, including sharing one or more components with the network proxy.

Figure 4:
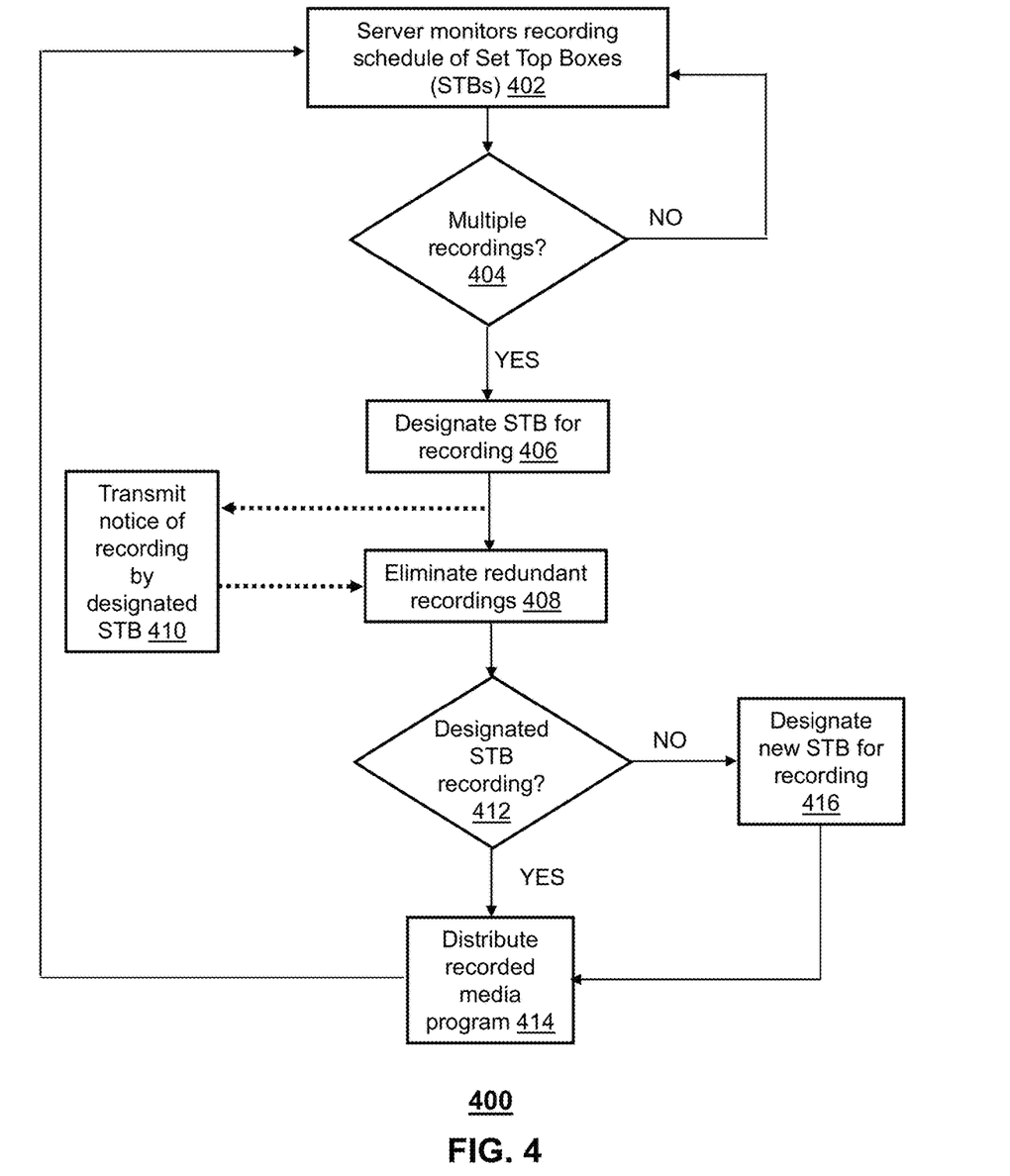
FIG. 4 depicts an exemplary method operating in portions of the communication systems.

FIG. 4 depicts an exemplary method 400 operating in portions of the communication systems 100-300. Method 400 has variants as depicted by the dashed lines. It would be apparent to an artisan with ordinary skill in the art that other embodiments not depicted in FIG. 4 are possible without departing from the scope of the claims described below. For convenience, reference to one or more features of communication system 300 as used in the following paragraphs can mean one or more features of the communication systems 100, 200, and 300 singly or in combination, including servers 322 and 350.

Method 400 begins with step 402 in which the STB server 350 can monitor the recording schedule for each of the STBs 106 within a group or community of STBs. The particular size and configuration of the group of STBs 106 can vary, and can be based upon a number of criteria, including geographic location and relationship between the subscribers. In one embodiment, the group of STBs 106 can communicate with each other over the internet. In another embodiment, the group of STBs 106 can be a virtual private or STB network. For example, the virtual STB network can be formed and can function using tunneling protocol through an existing network. The interconnected nodes associated with the group of STBs 106 can be maintained under a single administrative control or under multiple administrative authorities, such as being hidden from the public Internet.

In step 404, the STB server 350 can determine if there are multiple STBs 106 scheduled to record the same media programming. If there are not multiple recordings of a single media programming scheduled then the STB server 350 can continue to monitor the recording schedule for each of the STBs 106 within the group. If on the other hand, there are multiple recordings scheduled, then in step 406 the STB server 350 can designate one or more of the STBs 106 to record the media program (e.g., a host STB), and in step 408 can eliminate recording by any other STBs. The present disclosure contemplates a single STB 106 to be used to record the media program in order to maximize the preservation of resources of the group, or multiple STBs (e.g., two or three STBs) to record the program as a backup for poor quality recording or other potential failures.

The host STB can be chosen based upon a number of factors including available resources and frequency of recording by the STB. In one embodiment, the quality of recording by the STBs 106 of the group can be monitored, and can be used as a factor in determining whether an STB should be the host STB for recording a media program. In another embodiment, exception logic can provide for a scheduled recording to be moved to yet another STB 106 if the host STB's tuners are filled up by its user. The present disclosure also contemplates one or more STBs 106 which are not scheduled to record the media program to be designated as the host STB. For example, an STB 106 that is determined to be infrequently used, such as for part-time residents, can be designated as the host STB.

In one embodiment, the STB server 350 can provide notice to the STBs 106 that they will not be recording the media program due to the recordation by the host STB, as in step 410. The notice can be presented at the time the user of the STB 106 is scheduling the redundant recording or can be provided to the STB at some other time, such as near the scheduled time of the programming. The form of the notice can vary. For example, a visual message that the user is scheduling a redundant recording can be displayed on the recording screen as part of the normal steps taken in scheduling a recording with the STB 106. As another example, a message of redundant recording can be displayed during other programming, including a pop-up window or visually transparent message.

In step 412, the STB server 350 can monitor the host STB to ensure that the recording of the media program occurs and/or is occurring with a satisfactory quality. If the host STB records the entire media program then in step 414 the STB server 350 can provide the other STBs 106 with access to the recorded media program. If on the other hand the host STB is no longer scheduled to record the media program, ceases recording the program (e.g., near the end of the media program), and/or is capturing a low-quality recorded program, then in step 416 the STB server 350 can designate one or more other STBs 106 to record the media program, and access can be provided to the recorded program by the STB server 350 as recited in step 414.

Distribution of the recorded media program can be provided in various ways, such as by transmitting the media program to each of the STBs 106 that had requested recording. As another example, the recorded media program can be stored on the hard drive of the host STB or in another memory device, such as the memory of the STB server 350, so that each of the STBs 106 that had requested recording can access the recorded media program at their leisure. The distribution method can vary, including stream, progressive download, full download, or other means. In one embodiment, once the recorded media program has been made available to each of the STBs 106 that had requested recording of the program, then the host STB can delete the program to free up its resources.

Upon reviewing the aforementioned embodiments, it would be evident to an artisan with ordinary skill in the art that said embodiments can be modified, reduced, or enhanced without departing from the scope and spirit of the claims described below. In one embodiment, the group of STBs 106 can share resources through use of a de-centralized system. For example, the STBs 106 can coordinate amongst each other for designating a host STB to record the media program without utilizing an STB server 350 to make the determination. The STBs 106 can share their recording schedules with each other so that the host STB can be determined Where a host STB is no longer available for recording the media program then an arbitration process can be instituted, such as requiring the original host STB to locate another host STB to record the media program otherwise the original host STB must record the program. As another example, STBs 106 can override an elimination of its scheduled recording. User preferences can be used to determine the priority order of delivery of the recorded media program from one STB to another. For example, a user can indicate a time he or she intends to watch the program and that time can be a factor in determining priority of delivery. As another example, the determination of the host STB can be made in part based on the user preferences, such as where a user indicates that he or she will be viewing the program at the regularly scheduled time. The user preferences can be provided at various times, such as in response to a message regarding the recording of a media program or as part of a user profile associated with the STB.

As yet another example, other resources of the STBs 106 can be shared. For example, hard drive space on the STBs 106 can be shared amongst each other. The STB server 350 and/or the STBs 106 can eliminate redundant copies of recorded media programs that are stored on the STB hard drives. The choice of which copies to retain can be based upon a number of factors, such as the quality of the particular recording. The elimination of redundant copies can be maintained as STBs 106 are entering the group or leaving the group. For example, as an STB 106 is to be de-activated, such as a subscriber switching service providers, the stored media programs on the STB's hard drive can be transferred to another STB in the group.

As yet another example, backup functions can be achieved using the STB server 350 and/or the group of STBs 106. Where one STB 106 in the group has a faulty recording, the media program can be restored from an alternate STB within the group. This can be achieved in a number of ways, including dynamically by using an algorithm to determine recording quality, and providing the highest-quality version within a group to those with lower-quality recordings. In one embodiment, by using the STBs 106 within the group in a peered relationship to perform this function, the service provider may not be required to maintain a server-based backup service.

These are but a few examples of modifications that can be applied to the present disclosure without departing from the scope of the claims. Accordingly, the reader is directed to the claims section for a fuller understanding of the breadth and scope of the present disclosure.

Figure 5:
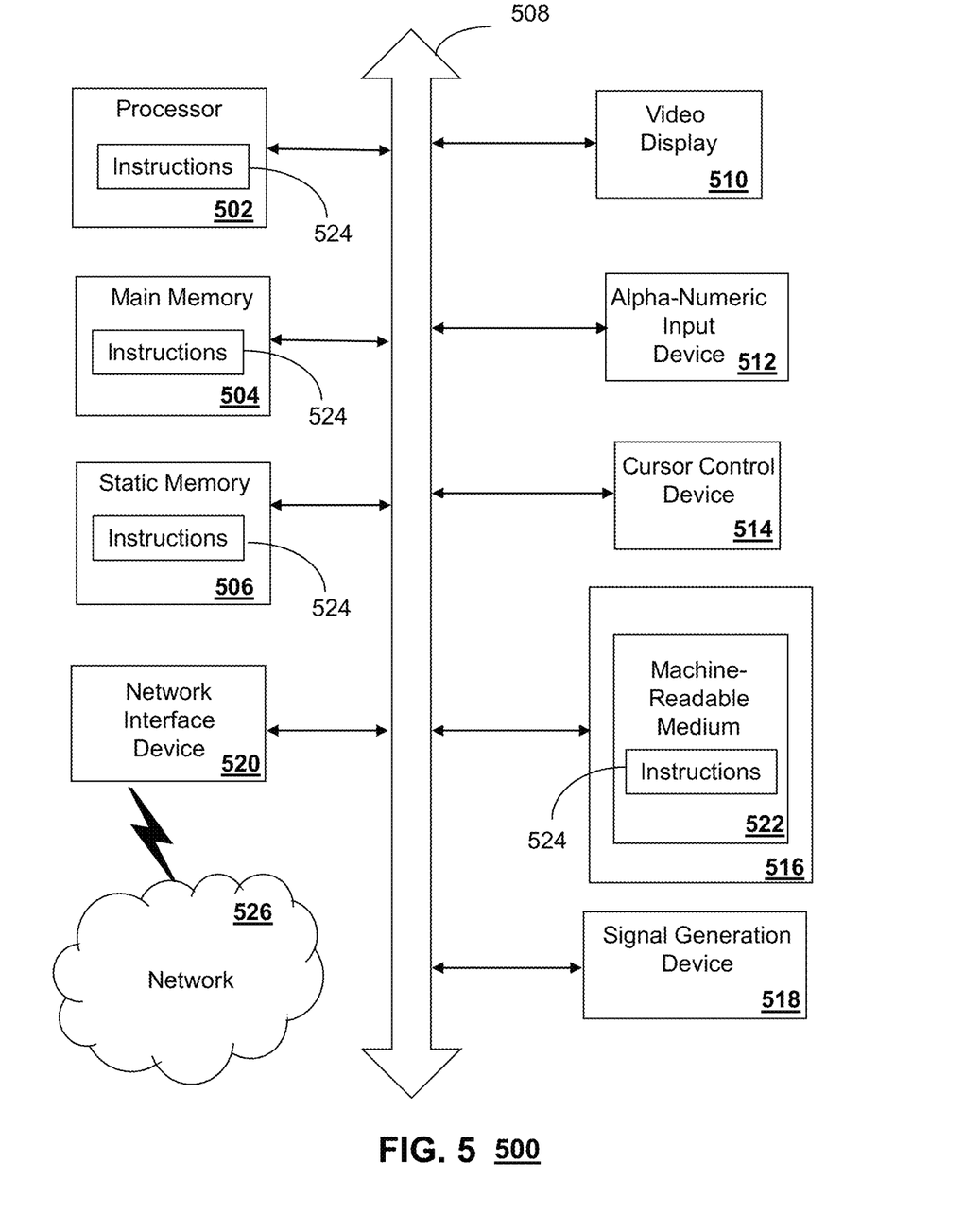
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor device, comprising:
   a memory that stores executable instructions; and
   a processing system including a processor coupled to the memory, wherein the executable instructions, when executed by the processing system, facilitate performance of operations comprising:
      receiving, from a server, a command to act as a host device for a group of media processors in communication with each other over a network, wherein each of the group of media processors is operable to record a media program, and wherein the media processor device is selected as the host device by the server based, in part, on the server determining that the media processor device is less frequently used relative to the group of media processors according to monitoring of recordings performed by the group of media processors and based, in part, on an indication of a time when the media processor device will be used for viewing the media program;
      determining that a first media processor of the group of media processors is scheduled to record a targeted media program based on the command to act as the host device;
      recording the targeted media program at the media processor device and directing the first media processor to cancel recording of the target media program responsive to determining that the first media processor is scheduled to record the targeted media program; and
      transmitting the targeted media program to the first media processor of the group of media processors responsive to a presentation request of the targeted media program by the first media processor.

2. The device of claim 1, wherein the media processor device comprises a server remotely located from the group of media processors, wherein the server is communicatively coupled to the network.

3. The device of claim 1, wherein the media processor device comprises a mobile communication device.

4. The device of claim 1, wherein the operations further comprise
   monitoring available resources of the group of media processors; and
   determining a scarcity of the available resources, wherein the recording of the targeted media program and the directing of the first media processor to cancel recording are further responsive to determining the scarcity of the available resources.

5. The device of claim 1, wherein the operations further comprise monitoring recordings of the targeted media program by the group of media processors.

6. The device of claim 5, wherein the monitoring is based on scheduled recordings for the group of media processors.

7. The device of claim 1, wherein the transmitting of the targeted media program comprises one of a progressive download of the target media program, a full download of the target media program, streaming transmission of the target media program, or any combination thereof.

8. The device of claim 1, wherein the operations further comprise:
  receiving a notice from the server indicating that the media processor device will not record a second targeted media program; and
  presenting the notice at a display.

9. The device of claim 1, wherein the operations further comprise:
  detecting an inability to record of a second targeted media program;
  directing a substitute host device of the group of media processors to record the second targeted media program; and
  directing the substitute host device to delete the second targeted media program after the first media processor has accessed the second targeted media program.

10. A non-transitory machine-readable storage device, comprising executable instructions which when executed by a processor facilitate operations comprising:
  receiving a command from a server to act as a host device for a group of media processors in communication over a network, wherein the host device of the group of media processors is selected by the server according to, in part, the server determining a frequency of use of the host device relative to the group of media processors according to monitoring of recordings by the group of media processors and based, in part, on an indication of a time when the host device will be used for viewing a media program;
  determining that two media processors of the group of media processors are both scheduled to record the media program;
  recording the media program at the host device based on the command to act as the host device; and
  providing the group of media processors with access to a copy of the media program via the host device.

11. The non-transitory machine-readable storage device of claim 10, wherein the machine-readable storage device is communicatively coupled to a server device that is remotely located from the group of media processors.

12. The non-transitory machine-readable storage device of claim 10, wherein the machine-readable storage device is communicatively coupled to a mobile communication device.

13. The non-transitory machine-readable storage device of claim 10, wherein the operations further comprise:
  detecting an inability of the host device to record a second media program;
  identifying a second media processor of the group of media processors as a substitute host device; and
  directing the substitute host device of the group of media processors to record the second media program.

14. The non-transitory machine-readable storage device of claim 10, wherein the operations further comprise:
  receiving a notice from the server indicating that a second targeted media program will not be recorded; and
  presenting the notice at a display.

15. The non-transitory machine-readable storage device of claim 14, wherein the monitoring is based on scheduled recordings for the group of media processors.

16. The non-transitory machine-readable storage device of claim 10, wherein the step of providing the group of media processors with access to the copy of the media program is by one of a progressive download of the copy of the media program, a full download of the copy of the media program, streaming transmission of the copy of the media program, or any combination thereof.

17. A method, comprising:
  receiving, by a media processor, an assignment from a server of the media processor as a host media processor, wherein the media processor is selected as the host media processor by the server based, in part, on a frequency of usage of the media processor relative to a group of media processors according to monitoring of recordings by the group of media processors and based, in part, on an indication of a time when the media processor will be used for viewing a targeted media program;
  recording, by the media processor, the targeted media program according to the assignment of the media processor as the host media processor;
  detecting, by the media processor, a first media processor of the group of media processors with a scheduled recording of the targeted media program;
  instructing, by the media processor, the first media processor to cancel the scheduled recording of the targeted media program; and
  transmitting, by the media processor, the targeted media program to the first media processor upon detecting that the targeted media program is being requested at the first media processor.

18. The method of claim 17, further comprising:
  receiving, by the media processor, a notice from the server indicating that a second targeted media program will not be recorded; and
  presenting, by the media processor, the notice at a display.

19. The method of claim 17, wherein the first media processor comprises a mobile communication device.

20. The method of claim 17, further comprising receiving, by the media processor, a request to record the targeted media program based on a quality of recording value associated with the host media processor, and wherein the media processor comprises multiple processors operating in a distributed processing environment.

\* \* \* \* \*